June 23, 1964     L. B. SCHUMACHER     3,137,922

METHOD OF MAKING A RIGID STRUCTURAL MEMBER

Filed Feb. 1, 1960     4 Sheets-Sheet 1

INVENTOR:
LEON B. SCHUMACHER

BY Francis T. Burgess
ATTORNEY

June 23, 1964  L. B. SCHUMACHER  3,137,922
METHOD OF MAKING A RIGID STRUCTURAL MEMBER
Filed Feb. 1, 1960  4 Sheets-Sheet 2

INVENTOR:
LEON B. SCHUMACHER
BY Francis T. Burgess
ATTORNEY,

June 23, 1964  L. B. SCHUMACHER  3,137,922
METHOD OF MAKING A RIGID STRUCTURAL MEMBER
Filed Feb. 1, 1960  4 Sheets-Sheet 3
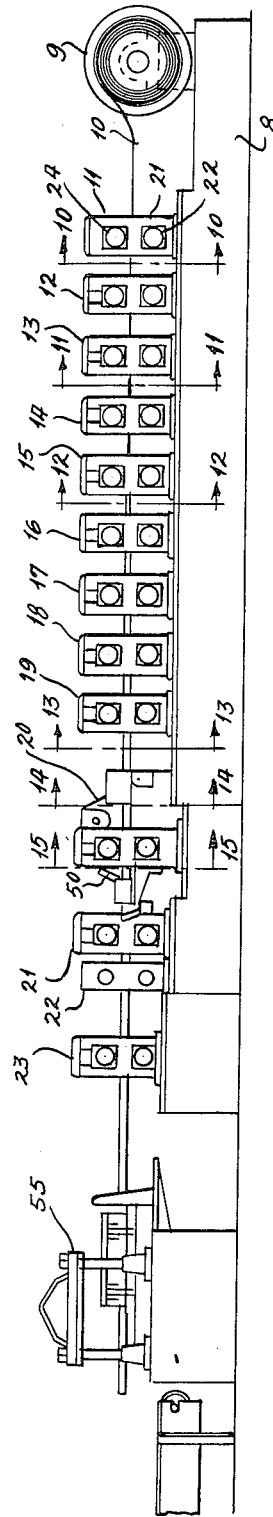
FIG. 8
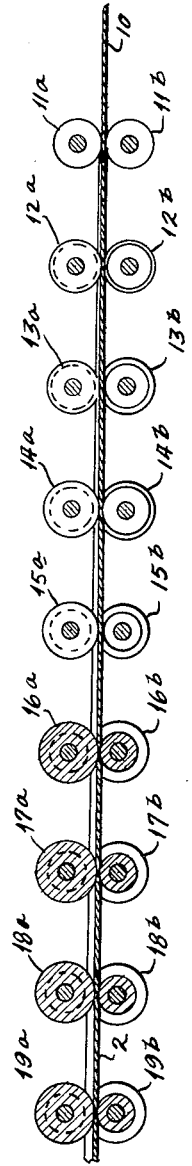
FIG. 9
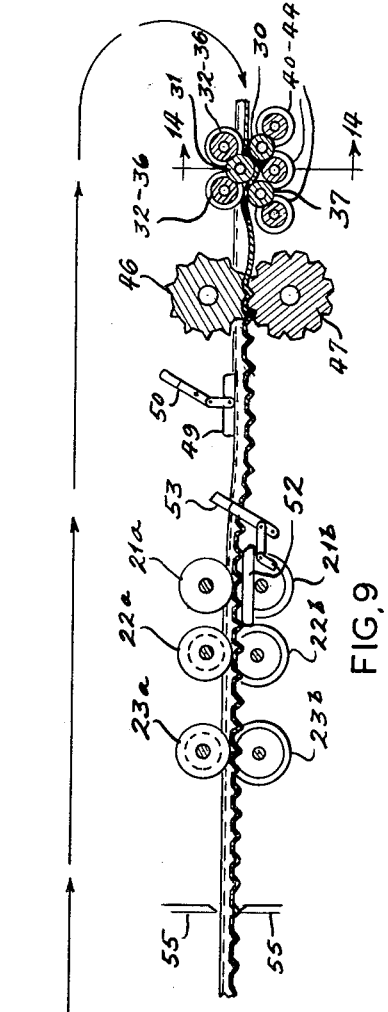
INVENTOR:
LEON B. SCHUMACHER
BY Francis T. Burgess
ATTORNEY.

June 23, 1964 L. B. SCHUMACHER 3,137,922
METHOD OF MAKING A RIGID STRUCTURAL MEMBER
Filed Feb. 1, 1960 4 Sheets-Sheet 4

INVENTOR
LEON B. SCHUMACHER
BY Francis T. Burgess
ATTORNEY

United States Patent Office 3,137,922
Patented June 23, 1964

3,137,922
METHOD OF MAKING A RIGID
STRUCTURAL MEMBER
Leon B. Schumacher, Dayton, Ohio (R.R. 1, Huron, Ohio)
Filed Feb. 1, 1960, Ser. No. 5,897
3 Claims. (Cl. 29—155)

The invention relates to a method of making rigid structural members, particularly metal roof decking.

Conventional steel roof decking frequently consists of narrow channel-shaped members adapted to be supported at or near their ends, with their flanges arranged to internest with corresponding flanges of adjacent members. In some designs, wider panels are formed with several narrow webs separated by channel-shaped corrugating parallel to the side flanges. In such members, the flanges or the flanges and corrugations provide the necessary vertical strength between the end supports, but the transverse vertical strength of the flat horizontal web portions between the flanges or between the flanges and corrugations is low, and accordingly the width of the web portions is usually limited to less than six inches. Since each member must be self-supporting to a degree, a large proportion of the material must be used in the flanges or in the flanges and corrugations.

It is a main object of the invention to provide a method of making rigid structural members, particularly steel roof decking of substantially lighter weight than conventional decking, yet capable of carrying a greater load with less deflection, on a longer span, than conventional decking.

It is a further object of the invention to provide a method of making rigid structural members, particularly steel roof decking having greater transverse vertical strength than any conventional type of roof decking, whereby substantially wider web portions can be utilized with a substantial reduction in the amount of material used in the flanges or corrugations for any given roof or floor area.

It is a further object to provide method of cold-forming transversely rigid roof and floor decking.

The foregoing and additional objects and advantages will be evident from the detailed description which follows, in connection with the drawings, in which:

FIGURE 8 is a side view of apparatus for forming the panel illustrated in FIGURES 4–7.

FIGURE 9 is a schematic view of the apparatus illustrated in FIGURE 8, taken along the longitudinal center line thereof.

Figure 1:
FIGURE 1 is a transverse vertical sectional view of a strip of cold-rolled full-hard sheet steel.
Figure 2:
FIGURES 2 and 3 are transverse vertical sectional views of a panel made according to the invention at two stages during its completion, showing it inverted for purposes of manufacturing.
Figure 3:
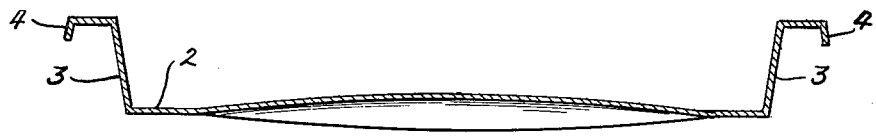
Figure 4:
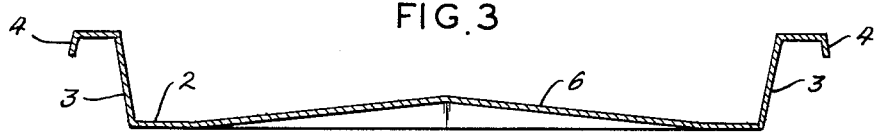
FIGURE 4 is a transverse vertical sectional view of the completed panel along the line 4—4 of FIG. 5, also inverted.
Figure 5:
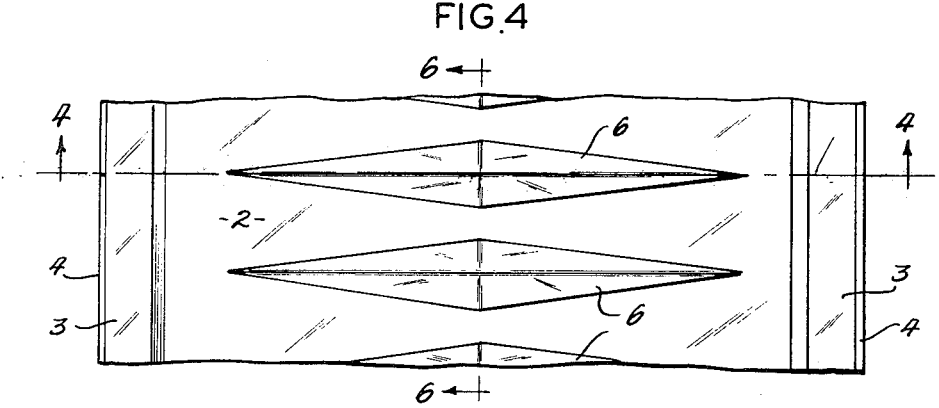
FIGURE 5 is a fragmentary plan view of the inverted completed panel.
Figure 6:
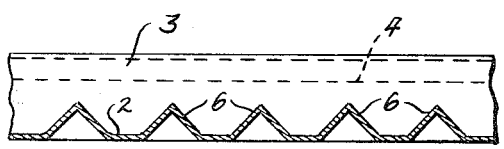
FIGURE 6 is a longitudinal vertical sectional view along the line 6—6 of FIG. 5.
Figure 16:
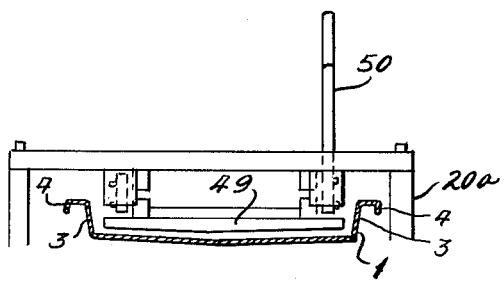
Figure 17:
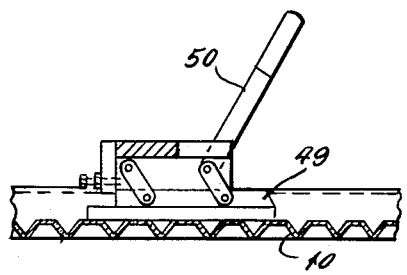
Figure 18:
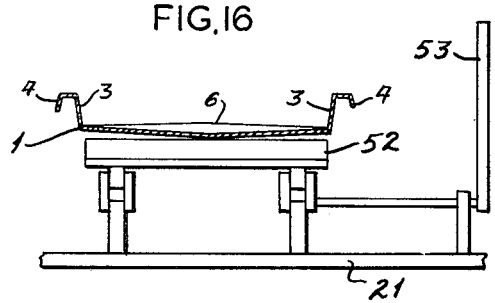
Figure 19:
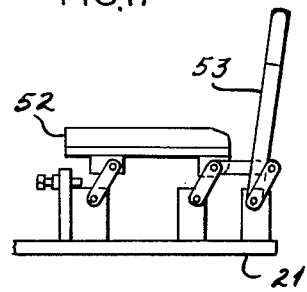
Figure 7:
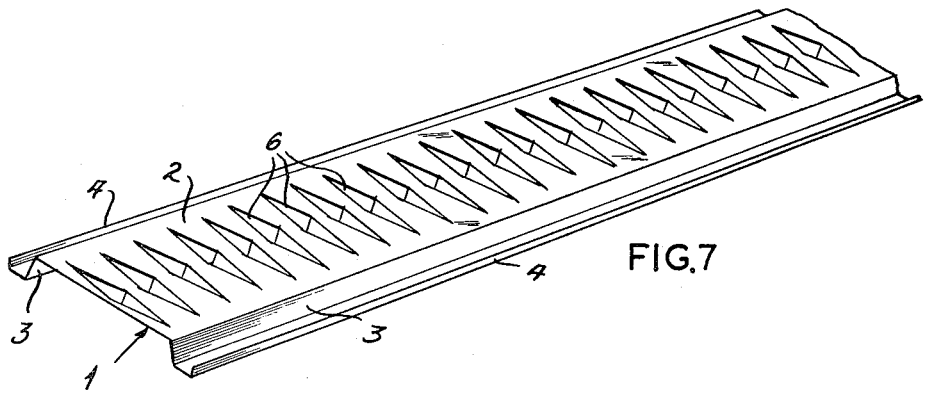
FIGURE 7 is a perspective view of a completed panel in its normal upright position.

FIGURES 16 and 17, and 18 and 19 are, respectively, transverse and side views of wooden pad devices for reducing embossing stresses in the panels.

Referring now to the drawings, the numeral 1 refers generally to a roof panel embodying the invention and comprising a normally horizontal generally flat web portion 2 formed with down-turned flanges 3 of angle-section, having upwardly-rebent terminals 4. The material of which this panel is made is full-hard cold-rolled sheet steel. It will be evident that the vertical strength of a panel of this type in a longitudinal direction is largely a function of the depth of the vertical leg of the angle-section flanges and of the physical strength of the material. Vertical strength transversely of the panel is substantially enhanced by the diamond-shaped corrugations generally indicated at 6. The corrugations are rhombic in plan with their major diagonals extending transversely of the panel and their minor diagonals co-linear with the longitudinal center line of the panel. In depth, the corrugations comprise rhombic pyramids, the intersections between the plane faces of which lie in the same vertical planes as the diagonals of the bases. To achieve the maximum strength in this construction it is desirable that both the flanges and the diamond corrugations be formed in the sheets by means of a cold working process, preferably as hereinafter described.

By utilizing this process, deeper corrugations can be formed in the webs than by any other known cold-working process, with a corresponding increase in the transverse vertical strength of the web. This strength is also enhanced by the diamond shape of the corrugations which have their maximum depth and width at the center of the web, where bending moments transversely of the web are at a maximum, and their minimum depth and width adjacent the sides of the web, where the bending moments are at a minimum. The physical strength of the material of the entire panel is substantially increased by cold-working.

Apparatus suitable for performing the cold-working operations in the formation of panels as described above is shown in FIGURES 8 through 19. FIGURE 8 is a side view of the apparatus and includes a base 8 on which are mounted, in sequence, a spool 9 carrying a coil 10 of full-hard cold-rolled sheet steel, a series of flange-forming roll stands 11 through 19, a combined cold reducing and embossing roll stand 20, and straightening roll stands 21, 22, and 23.

Figure 10:
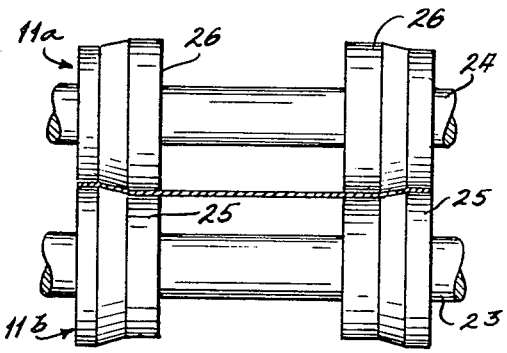
FIGURES 10–15 are transverse vertical sectional views, along the lines 10—10 through 15—15, respectively, of FIGURE 8.
Figure 13:
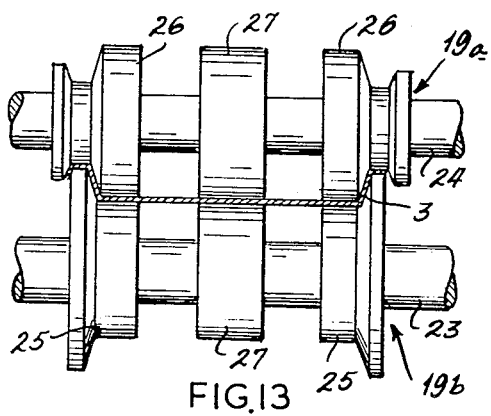
Figure 11:
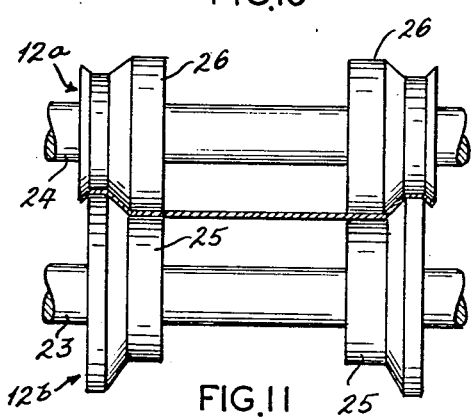
Figure 14:
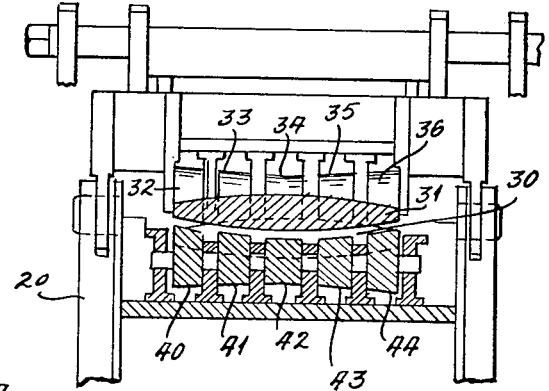
Figure 12:
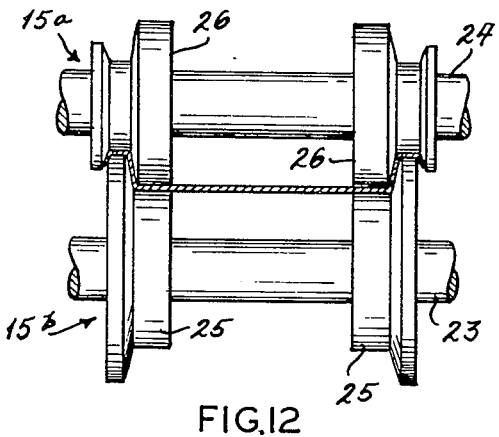
Figure 15:
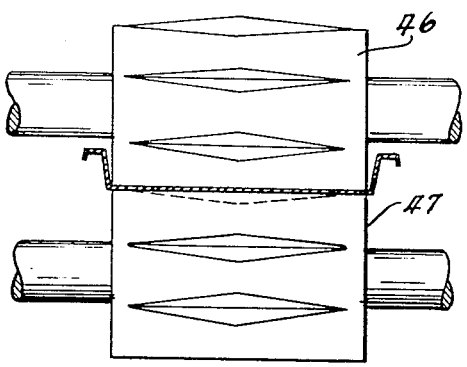

Stands 11 through 19 and 21 through 23 are each two-high stands of conventional construction, comprising spaced upright side members, in which the trunnions of the lower rolls 11b through 19b and 21b through 23b are fixedly journalled and the trunnions of upper rolls 11a through 19a and 21a through 23a are vertically adjustably journalled. In stands 11 through 19, the rolls each have transversely-spaced generally cylindrical portions 25 and 26 formed with mating annular grooves and projections of gradually increasing depth and height as best seen in FIGS. 10 through 12, for forming the flanges 3 on both sides of strip 10 as it passes between them. For initially moving the strip, the rolls of the stands, 16 through 19, in addition to the flange-forming side portions, each have an enlarged central cylindrical portion 27 for frictionally-engaging the upper and lower surfaces of the web 2 and thus urging it onwardly through the mill. Flanges 2 are fully formed when the strip passes stand 19.

The next two steps are performed at stand 20, and both relate to the formation of the deep diamond-shaped corrugations 6 in the web. In order to provide sufficient depth to achieve the desired transverse vertical strength, an elongation of the central portion of the web approximately twice the maximum elongation permitted by the physical properties of the material is desirable. The major part of this elongation is accomplished by a two-stage cold reduction in the thickness of the web, varying from a minimum adjacent the sides of the web to a maximum at the center of the web. This reduction with consequent elongation is performed at stand 20 preferably by drawing the strip between a bottom convex roll 30, journalled in stand 20, an upper floating convex roll 31 backed up by two sets of conical back-up rollers 32–36, journalled in the upper portion of stand 20, and then between upper convex roll 31 and a second bottom convex roll 37 journalled in the bottom portion of stand 20, the distance between the cooperating rolls 30, 31, and 37 gradually decreasing from a maximum near their outer ends, adjacent the flanges 2 of the strip, to a minimum at the center line of the strip. Bottom rolls 30 and 37 are backed up by three series of conical rollers 40–44, journalled in the lower portion of stand 20. As a result of this variable elongation of the strip, with consequent increase in the area of the central portion of the web which is at a maximum adjacent the longitudinal center line and at a minimum adjacent the sides of the strip, the middle portion of the strip bulges. Embossing rolls 46 and 47 are also rotatably mounted in the same stand 20 as the convex cold reducing rolls 30, 31, and 37 and the cold reducing rolls and their back-up rollers are of very small diameter to permit their being located as close as possible to the embossing rolls; this eliminates the possibility of the strip becoming badly twisted after it has been initially elongated and before the diamonds have been embossed in its web. Embossing rolls 46 and 47 are formed, respectively with a plurality of mating projecting and recessed rhombic pyramids, elongated axially of the rolls and equally spaced circumferentially of the rolls.

Embossing rolls 46 and 47, are geared to each other to maintain the mating projections and recesses in registry with each other. The embossing rolls 46 and 47 are provided with conventional driving means for bringing the material through the machine initially. This driving means is preferably disengageable automatically when the apparatus reaches its normal operating speed of 100 feet per minute.

After initial elongation by means of the cold reducing rolls 30, 31, 37, the strip passes between embossing rolls 46 and 47, and the deep diamond corrugations 6 are embossed in its web. This step causes a further elongation of the metal of the web, but the major elongation, in the order of 85% of the total elongation, was performed by the cold reducing rolls, so that only the remaining 15% need be performed by the embossing rolls. It will be evident from the foregoing that this combination of steps made possible the great total elongation desired, which is in the order of 3%, even though the maximum permissible elongation is in the order of 1.5%. The major part of this elongation is achieved by cold reducing in two stages, between rolls 30 and 31, and 31 and 37. The minor part of the elongation is accomplished by stretching, between the opposing surfaces of the embossing rolls, and, even though the patterns on the embossing rolls are relatively sharply delineated, the embossing causes no tearing of the material because, since the major elongation was previously performed, the elongation performed by the embossing step is much less than the permissible elongation of the material.

After passing through embossing rolls 46 and 47, the strip passes beneath a downwardly-movable, substantially horizontal wooden pad, or shoe 49, mounted on a bracket 20a on stand 20 and manually adjustable to a desired level by means of a linkage including adjusting lever 50, for engaging the upper surface of the embossed sheet, thereby relieving rolling stresses resulting from the embossing operation and thus preventing later distortion or twisting of the panel.

Stand 21 mounts a pair of rolls 21a and b engageable only with the flanged portions of the strip and adapted, in cooperation with similar rolls 22a and b 23a and b mounted in stands 23 and 24, to straighten any irregularities in the flanges resulting from the cold reducing and embossing operations. The latter mentioned rolls are driven, and, through engagement with the flanges of the work, draw the work through the apparatus. Intermediate the flange-engaging portions of the upper and lower rolls in stand 21, a similar upwardly-acting pad 52 underlies the strip and is supported on stand 21 for manually adjustable upward movement by means of a linkage including hand-lever 53 for engagement with the underside of the strip in order to assist in the relief of the embossing stresses previously partially relieved in a downward direction by the pad 49. After passing through stand 23 the fully formed strip passes into the shear 55 where it is cut into predetermined lengths.

The invention may be modified in various respects as will occur to those skilled in the art and the exclusive use of all modifications coming within the scope of the appended claims is contemplated.

What is claimed is:

1. The method of forming deep embossed transversely extending corrugations in a strip of sheet metal with the depth of each corrugation varying transversely of the strip, comprising the steps of variably cold reducing the thickness of the metal in the regions to be embossed to provide an elongation substantially greater than the maximum determined by the physical properties of the metal in proportion to the relative depth of the corrugation in these regions whereby to provide a proportionate increase in surface area in such regions, and pressing the metal between mating projecting and recessed dies in the shape of the desired corrugations.

2. The method of forming, by cold-working, transversely extending corrugations of substantial depth in a metal strip with the depth of each corrugation varying transversely of the strip, comprising the steps of variably cold reducing the thickness of the strip in the regions to be embossed to provide a greater elongation than the maximum determined by the physical properties of the material of the strip, said elongations to vary transversely of the strip in proportion to the relative depth of the corrugations whereby to provide proportionate transversely varying increases in the surface area in such regions, and thereafter passing the sheet between opposing mating embossing dies, urging said die toward each other and thereby forming the desired relatively deep corrugations in the surface of the sheet.

3. The method of forming, by cold-working, rigid steel panels having deep transversely extending corrugations in their webs with the corrugations varying in depth transversely of the webs, comprising the steps of forming flanges on the sides of a strip of cold rolled full hard steel by a cold rolling process, variably elongating the web portion of said strip between the flanges to a maximum elongation greater than that determined by the physical properties of the metal, by variably cold reducing the thickness of said web portion, the reduction in thickness and consequent elongation being varied transversely in proportion to transverse variations in the depths and areas of the corrugations and passing the strip between a pair of mating embossing rolls formed with the desired corrugation pattern.

References Cited in the file of this patent

UNITED STATES PATENTS

| | | |
|---|---|---|
| 1,814,593 | Gersman | July 14, 1931 |
| 1,833,043 | Sheldon | Nov. 24, 1931 |
| 2,085,829 | Rogers | July 6, 1937 |
| 2,144,572 | Kentis | Jan. 17, 1939 |
| 2,180,504 | Bradfield et al. | Nov. 21, 1939 |
| 2,327,844 | Johnston | Aug. 24, 1943 |
| 2,378,661 | Slazer | June 19, 1945 |
| 2,692,421 | Cozzo | Oct. 26, 1954 |
| 2,697,997 | Burroughs | Dec. 28, 1954 |
| 2,909,138 | Lawson | Oct. 20, 1959 |
| 2,910,152 | Edgar | Oct. 27, 1959 |
| 2,979,806 | Macomber | Apr. 18, 1961 |
| 3,040,799 | Hanson | June 26, 1962 |